Feb. 24, 1931.　　　V. L. WARD　　　1,793,978
DUAL PRESSURE PUMP
Filed Oct. 8, 1927
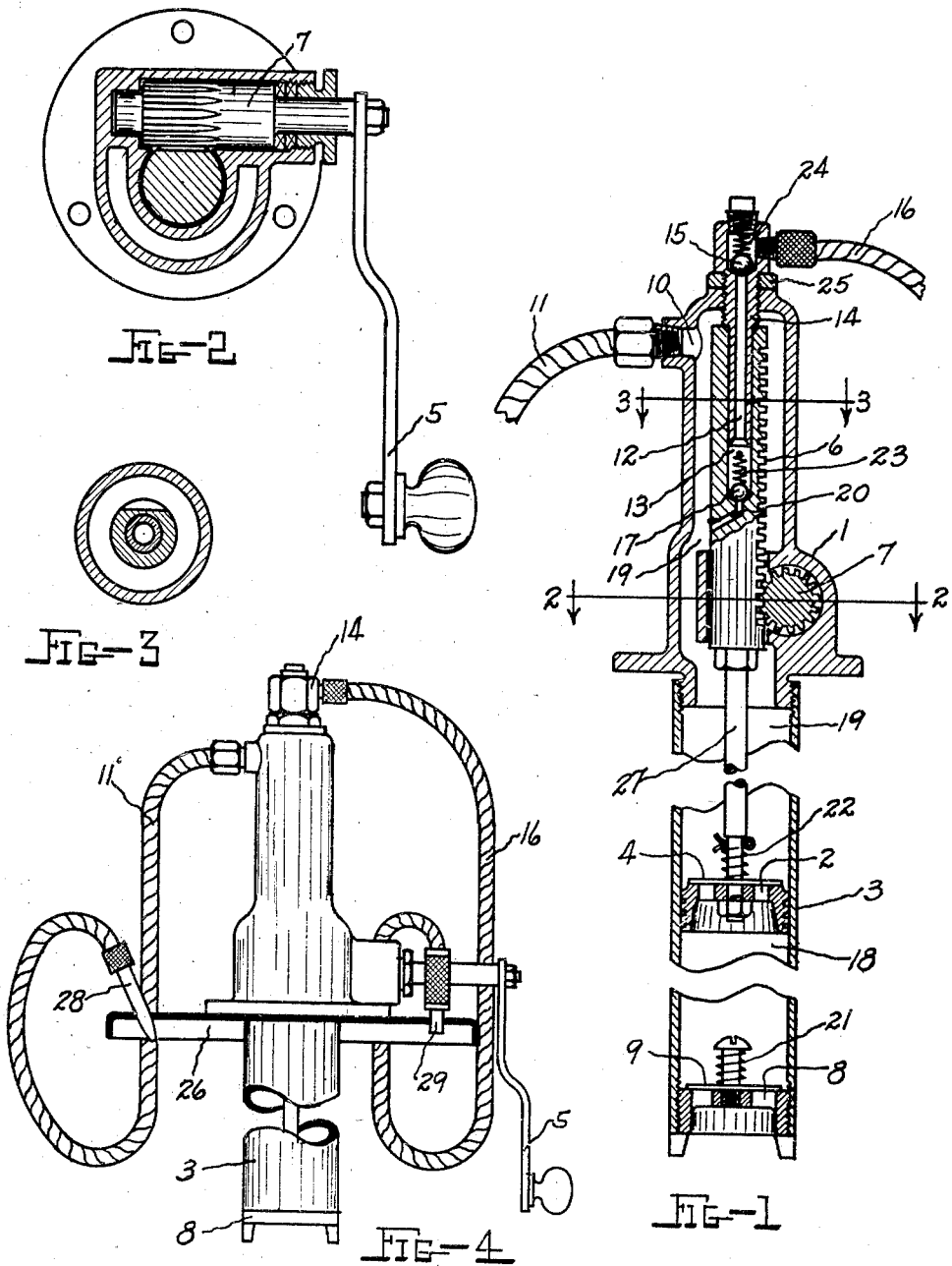
INVENTOR.
V. L. Ward.
BY John B. Brody
ATTORNEY Patented Feb. 24, 1931

1,793,978

UNITED STATES PATENT OFFICE

VALLEY L. WARD, OF FREDERICK, MARYLAND

DUAL PRESSURE PUMP

Application filed October 8, 1927. Serial No. 224,919.

My invention relates broadly to a combination high and low pressure grease pump, and more particularly to a dual pressure pump for greasing automobiles.

One of the objects of my invention is to provide a high and low pressure grease pump for lubricating the transmission and differential under low pressure operation and for the lubrication of the chassis under high pressure operation accomplishing the two operations with one compact unit.

Another object of my invention is to provide a combination high and low pressure grease pump employing the principles of the hydraulic ram, wherein an operating cylinder of small cross-sectional area is provided for high pressure operation, and an operating cylinder of larger cross-section is employed for lower pressure.

Still another object of my invention is to provide a small compact, portable and inexpensive combination high and low pressure grease pump applicable to many purposes.

My invention will be more fully understood from the specification hereinafter following by reference to the accompanying drawings, in which:

Figure 1 illustrates in section the construction and principle of the combination high and low pressure grease pump; Fig. 2 illustrates a section of Fig. 1 taken on line 2—2; Fig. 3 illustrates a section of Fig. 1 taken on line 3—3; and Fig. 4 illustrates the complete unit attached to the cover plate 26 ready for commercial use.

Referring to the drawings in more detail, reference character 1 designates the main casting which acts as the housing for the combination high and low pressure grease pump. 2 is a piston fitted in a cylinder 3 with a check valve 4. When piston 2 is operated upward or downward in cylinder 3 by turning handle 5 in a circular motion operating rack 6 connected to piston 2 by piston rod 27, it has a pumping action, that is, when handle 5 is turned clockwise, pinion 7 operates rack 6 upward producing a vacuum in opening 18 causing it to fill with grease, passing through foot valve 8 and check valve 9. When the rack reaches its extreme upward position, as shown in Fig. 1, the handle 5 is then turned counter clockwise. Check valve 9 closes due to the action of spring 21 and pressure of grease in opening 18. Check valve 4 in piston 2 opens against the action of spring 22 and the grease in opening 18 then passes through the piston valve into opening 19.

When this operation is reversed, the grease in opening 19 will then pass out opening 10 to hose 11, either to the part to be lubricated or returned to the drum as shown in Fig. 4 at 28.

A portion of this grease is trapped in opening 12 and 13 when rack 6 was in its lowest position and was disengaged from stationary piston 14. When rack 6 returns on its upward movement and becomes engaged with stationary piston 14, this trapped grease in opening 12 and 13 passes out through hose 16, either to the part to be lubricated or returned to the drum, as shown in Fig. 4 at 29. If the part to be lubricated is closed by any foreign matter, the pressure will be up to the point of dislodging this obstacle. If it becomes necessary to work on the part lubricated and pressure is desired at the same time, the pressure built up in the hose 16 is held by the action of the ball check valve 15 and spring 24. Should it become necessary to operate handle 5 in a very short arc and rack 6 is already engaged with stationary piston 14 and these parts cannot be disengaged for filling purposes, then the handle 5 may be worked backward and forward in a short arc and the action of the stationary piston 14 produces a vacuum in opening 12 and 13, thereby drawing in grease from opening 19 through opening 20, ball check valve 17 and spring 23 to be built up to high pressure.

The quantity of grease pumped through hose 11 at low pressure can be regulated by screwing out stationary piston 14 and tightening lock-nut 25 allowing rack 6 to make a longer stroke.

The pressures obtainable from the pump are determined by the respective sizes of the passages for the grease, and I provide passages of such sizes as will permit the required high and low pressure charges to be obtained.

What I claim as new and desire to secure by Letters Patent of the United States is as follows:

1. A grease pump for delivering grease under two different pressures comprising a casing, a pump connected to one end of said casing, a member connected to said pump and disposed within said casing for reciprocatory movement therein, a low pressure cylinder for grease, a low pressure passage for grease formed by said low pressure cylinder and disposed around said member within said casing, a low pressure dispensing tube connected with said low pressure passage, said member being centrally apertured to form a high pressure cylinder and connected adjacent its base with said low pressure passage in said casing, a tubular guide projecting interiorly of said member from one end thereof for receiving grease through the interconnecting passage from the low pressure passage surrounding said member, valves at the end of said high pressure cylinder and in the upper extremity of said guide a dispensing tube connected to the upper extremity of said tubular guide, and means for driving said member for operating said pump and delivering grease through each of said dispensing tubes under different pressures.

2. Lubricant dispensing means comprising a reciprocatory pump, a housing forming a low pressure cylinder for said pump, a movable member operative concentrically within said housing for imparting motion to said pump, said movable member having a high pressure cylinder therein aligned with the axis of said housing and ported to receive lubricant from said low pressure cylinder simultaneously with the delivery of lubricant in said low pressure cylinder around said movable member, means associated with said low pressure cylinder and said high pressure cylinder to form with said cylinders low and high pressure pumping means, a driven gear engageable with said movable member for reciprocating said member in said housing for effecting a filling operation of the high pressure cylinder in said movable member and in the low pressure cylinder surrounding said movable member, and delivery means connected to both of said high and low pressure cylinders for delivering lubricant under different degrees of pressure.

3. Lubricant dispensing means comprising a pump cylinder adapted to project into a grease containing tank a reciprocatory piston in said cylinder, a low pressure grease storage and discharging cylinder communicating with said pump cylinder, discharge means connected with said low pressure cylinder, a rack member longitudinally movable in said low pressure cylinder, connecting means between said rack member and said piston, a high pressure cylinder disposed concentrically within said rack member and communicating with said low pressure cylinder, means secured to said low pressure cylinder and telescopically connected with said high pressure cylinder for dispensing grease from said high pressure cylinder simultaneously with the discharge of grease from said low pressure cylinder, and means for imparting reciprocatory movement to said rack member for alternately storing grease in said high and low pressure cylinders and discharging grease therefrom.

4. Lubricant dispensing means comprising a pump cylinder adapted to project into a grease containing tank a reciprocatory piston in said cylinder, a low pressure grease storage and discharging cylinder communicating with said pump cylinder, discharge means connected with said low pressure cylinder, a rack member longitudinally movable in said low pressure cylinder, connecting means between said rack member and said piston, a high pressure cylinder disposed concentrically within said rack member and communicating with said low pressure cylinder, a depending tubular member secured adjacent its upper end in said low pressure cylinder in alignment with the high pressure cylinder within said rack member and adapted to guide said high pressure cylinder in an axial path during the reciprocatory movement thereof concentrically within said low pressure cylinder for dispensing grease from said high pressure cylinder simultaneously with the discharge of grease from said low pressure cylinder, and means for imparting reciprocatory movement to said rack member for alternately storing grease in said high and low pressure cylinders and discharging grease therefrom.

In testimony whereof I affix my signature.

VALLEY L. WARD.